Patented Jan. 29, 1946

2,393,920

UNITED STATES PATENT OFFICE 2,393,920

PROCESS FOR THE LIBERATION OF THE MAGNESIA OF MAGNESIUM SILICATES

Walter H. MacIntire, Knoxville, Tenn., assignor to American Zinc, Lead & Smelting Company, St. Louis, Mo., a corporation of Maine No Drawing. Application May 28, 1942, Serial No. 444,918

7 Claims. (Cl. 23—201)

This invention pertains to a process for liberating the magnesia of magnesium silicates and the resultant calcium silicate-MgO product.

The process is preferably predicated upon the calcination of a mixture of dolomite and a mineral silicate of magnesium, the calcination effecting the disruption of the dolomite into its component oxides of calcium and magnesium and with a simultaneous reaction of the liberated calcium oxide with the silica and a resultant benefication of the silicate whereby its magnesium content is brought into the oxide form. The application of the heat requisite for calcination of the dolomite is designed for the twofold purpose of calcining the dolomite into its component oxides of calcium and magnesium and further raising the dolomite-silicate mixture to that temperature requisite for the simultaneous and further step of an exchange reaction between the nascent, or freshly generated lime (CaO) and the silica content of a refractory mineral magnesium silicate, whereby the magnesium oxide component of the silicate is liberated as such.

This result is of considerable novelty as it is well known in the art that the MgO component of mineral silicates is not separated from the silica component thereof when the silicates are subjected to direct calcination.

There is imperative need at this time for magnesic materials of high and readily extractible MgO content. It is also desirable to obtain a mixture of magnesium oxide and calcium silicate as a product of potential hydraulic tendencies and properties.

A further objective is the production of a product of high content of readily extractible magnesia to provide a potential source for magnesium salts, and particularly as a source of elemental magnesium.

A further object is the development of a product characterized by a high content of readily available magnesium oxide along with a substantial minor proportion of calcium in a mild and non-caustic form which is capable of reaction with acidic compounds and which can be mixed advantageously with various phosphatic materials.

The Pattison process has been used as a source of the oxide and carbonate of magnesium in the manufacture of chemical and insulating material for many years, despite the fact that this process necessitates the complete calcination of dolomite and the re-carbonatation of the burnt lime generated during calcination, as well as the re-carbonatation and preferential re-solution of the magnesium oxide of the dolomitic calcine. It is well known, however, that the refractory nature of the mineral silicates of magnesium is such that no benefication as to the magnesium oxide solubility, but rather the reverse effect, is resultant from the calcination of said silicates. It is further apparent that it would be highly advantageous to solubilize these minerals since extensive and readily accessible deposits of magnesium silicates are available, which have a magnesia (MgO) content more than twice that occurring in dolomite.

I have discovered that the magnesium oxide content of a dolomitic calcine can be enriched substantially, and to the extent of the whole magnesium oxide content of a mineral magnesium silicate, by the addition of a mineral magnesium silicate. In carrying out the new process I first make an intimate mixture of a definite amount of dolomite and an amount of the mineral magnesium silicate which will supply one atomic weight of magnesium for each atomic weight of calcium present as a component of the calcium carbonate ($CaCO_3$) content of the raw dolomite. This intimate and finely comminuted mixture is then subjected to calcination in an electric furnace for periods varying from 15 minutes to 4 hours, at a sustained temperature of about 1000° C. The magnesia is then separated mechanically or removed chemically from the calcium silicate and impurities by known methods; for example, the magnesia may be extracted by carbonated water as in the well known Pattison process mentioned above.

It has been determined that the length of the period of heating and the temperature imposed are governed by the properties desired for the calcine. For example, although the calcium component of the calcium carbonate content of the raw dolomite readily undergoes a complete interchange with the magnesium of the magnesium silicate, with resultant formation of calcium silicate and magnesium oxide, the behavior of the calcium silicate formed in the minimum period of calcination differs quite markedly from the behavior of the calcium silicate content of the product generated by the 3-hour period of calcination. In other words, the amount of silica which undergoes solvation when the calcine from the brief calcination is subjected to dilute acid treatment in aqueous suspension is much higher than the progressively decreased quantity dissolved when a similar extraction treatment is imposed upon the calcine resultant from the more extended period of calcination. This progressive decrease in silica solubility is true for the calcine obtained within the calcination range of 15 minutes to 3 hours. I have discovered, however, that when the calcination is extended to 4 hours the silica solubility reverts to a high degree of solubility comparable to that of the 15-minute calcine.

A further object of the invention is to bring about the aforementioned reaction so as to generate a product physically similar to the starting raw mixture without the production of a melt, or a fusion, or even a granulated sinter. This, I found could be accomplished by the imposition of a temperature of approximately 1000° C. in the calcination of the finely ground mixture of raw dolomite and mineral magnesium silicate, even when the calcination period was extended to 4 hours. The reaction may, however, be brought about at a temperature below 1000° C., i. e., one close to 850° C., when the calcination is conducted in an atmosphere of steam.

I have further determined that raising the calcination temperature to approximately 1100° C. enables the production of a sinter, composed of calcium silicate and magnesia. This form may be preferable for certain uses of the product. It will be recognized that the specific sintering temperature may vary for different mixtures of variant dolomite and magnesium silicate minerals.

Another form of the calcination product is a glassy melt of calcium silicate in which the liberated magnesium oxide occurs in solid solution. To obtain this product a still higher temperature, beyond 1500° C., is required. It will be obvious that the separation of the calcic and magnesic component of the glassy melt involves a different technique from those which can be utilized in the mechanical separation or in the chemical removal of the magnesium oxide from the calcium silicate and impurities, when the product is to be used as a source of either magnesic compounds or elemental magnesium.

In using the finely ground mixture for carrying out the process I have found it feasible to adopt the wet-comminution technique which is well known in the cement industry. The interchange of the calcium of the dolomite for the magnesium of the silicate during the prescribed calcination is a phenomenon governed by surface contact between the particles of the two dissimilar starting minerals. A wet grinding, as practiced in the cement industry, has therefore proved most efficacious as the first step in the proposed operation.

While the process of grinding the mixture of raw material, as in the cement industry, may be preferable in some instances and localities and while it may be particularly preferable that the ultimate product be in the powdery form which results from the calcination of the wet mixture, nevertheless shaft burning may be preferable in some instances and localities. The calcination may be conducted in shaft furnaces by briquetting the finely ground wet slurry into briquets of size appropriate to the particular shaft furnace and of such size as to assure ready removal of the carbon dioxide liberated from the carbonates of the dolomite content of the mixture during calcination.

In carrying out the process I prefer to use the purest available form of dolomite and the most concentrated form of mineral magnesium silicate. I particularly prefer the mineral of the type classified as dunite, forsterite or olivine, a highly refractory mineral characterized by a high incidence of $Mg_2SiO_4$, an MgO content of 46–48%, and a melting point of 1890° C. Olivine is preferred because of its higher concentration of magnesium in comparison with its degradation derivative, the mineral serpentine, $H_4Mg_3Si_2O_9$. It has been determined, however, that serpentine may be substituted for olivine and that when dehydrated, the serpentine approaches the olivine in its MgO concentration. Obviously, I prefer to use that form of mineral magnesium silicate which is most accessible and economical, and I therefore do not restrict myself to the olivines or serpentines. It will be apparent to one skilled in the art that the higher the degree of purity and concentration of the starting material, the more concentrated will be the product.

In practicing the invention, I have brought together dolomite of known calcium and magnesium carbonate content with olivine or serpentine, of known $SiO_2$ and MgO content, in such proportions as to supply 40 parts of Ca to 24.32 parts of Mg by weight and also in the proportion of 56 parts of CaO to 60 parts of $SiO_2$. The product of the first-mentioned ratio contained 42.5% of MgO when derived from a starting mixture of 1.9 parts of an N. C. dolomite to 1 part of an N. C. olivine which contained 46.1% of MgO. The product resulting from the use of the other mixture, or $CaO:SiO_2$ proportion of 1.3 parts of dolomite to 1 part of olivine had an MgO content of 43.6%. The free lime (CaO) content of the product from the first-mentioned calcine was 2.03%, while that from the second calcine was 2.73%.

When a similar comminuted mixture of 1.25 parts of N. C. dolomite and 1 part of a serpentine were calcined at 1000° C. the product contained 41.32% of MgO and 1.61% of free lime (CaO). As the desired objective is to transform into an active oxide form all of the magnesia content of the dolomite and all of that occurring in the mineral silicate it may be advantageous to determine whether or not the most effective proportion for a specific type of starting material differs from the computed stoichiometric proportion. It will be understood that the intent is to bring together nascent lime and a magnesium silicate in a proportion which is conducive to the formation of calcium metasilicate at a temperature far below the 1512–1540° C. fusion point of the generated calcium metasilicate. Further, in some cases any appreciable content of free lime (CaO) would be undesirable, whereas for other uses the presence of lime would not be objectionable.

The process is designed to generate a mild calcine whose augmented MgO content is more than twice that of raw dolomite and about twice that of a calcine made from a mixture of dolomite with quartz in the unimolal $Ca:SiO_2$ ratio. It contemplates that the magnesium content of a refractory type of material, recalcitrant toward ordinary and conventional chemical treatment, will be converted into an oxide form and condition conducive to ready separation from the associated calcium silicate by either mechanical or chemical means.

Although an object of the present invention is to make available for economic usage the enormous quantities of waste dolomite which have accumulated as a by-product of the metal industries in certain areas and the utilization of finely ground by-product magnesium silicate, the principle of my invention may be utilized with other starting materials. For example, a mixture of high calcic limestone and a magnesium silicate such as olivine or serpentine may be utilized, the calcination of which mixture will effect an interchange between the calcium component of the limestone and the magnesium of the magnesium silicate. In this case, however, the amount of by-product $CO_2$ evolved during calcination will be only about one-half that evolved in the dolomite operation.

The mixture of limestone and magnesium silicate is appropriate to assure proper fixation of both the $SiO_2$ of olivine and the generated $SiO_2$ from a FeSi reduction in mixtures of limestone olivine and FeSi.

In this alternative process it will be understood that all of the MgO content of the product is derived solely from the mineral magnesium silicate.

It will be understood that the limestone-olivine product could be made to conform to the Ca—Mg—$SiO_2$ content of a calcine derived from dolomite and olivine.

The product of the limestone-magnesium silicate reaction is essentially the same as that obtained by the dolomite-olivine reaction. In the alternative reaction, i. e., limestone-magnesium silicate, a unimolal Ca:Mg ratio is preferred, the limestone being added in such an amount that one mol of calcium is present for each mol of magnesium contained in the magnesium silicate. As a unimolal proportion of Ca:Mg in the starting mixture yields the desired product, comprised of calcium silicate ($CaSiO_3$) and magnesia (MgO), no benefit will accrue from the use of a higher proportion of calcium and the resultant generation of the free lime diluent, unless such an excess would fit the CaO-enriched and MgO-diluted calcine to some specific usage.

The factors of time and calcining temperatures and the accelerating effect of an atmosphere of steam are common to the calcination of the dolomite-magnesium silicate and limestone-magnesium silicate mixtures. The temperatures herein mentioned for the dolomite-magnesium silicate calcination apply to the limestone-magnesium silicate calcination, the same types of calcines resulting therefrom.

The invention is susceptible of numerous embodiments without departing from the spirit thereof. Attention is therefore directed to the appended claims for a definition of the scope of the invention.

What is claimed is:
1. The process which comprises the steps of mixing a finely divided material of the group consisting of burned and unburned calcic carbonate and dolomitic materials with a finely divided mineral magnesium silicate, and calcining the mixture at a temperature between about 850° C. and 1100° C. in an atmosphere of steam, the proportions of the mixture being such as to induce liberation of the MgO content of the silicate.

2. The process which comprises the steps of mixing a finely divided material of the group consisting of burned and unburned calcic carbonate and dolomitic materials with a finely divided mineral magnesium silicate, and calcining the mixture at a temperature of approximately 850° C. in an atmosphere of steam, the proportions of the mixture being such as to induce liberation of the MgO content of the silicate.

3. The process which comprises the steps of mixing a finely divided material of the group consisting of burned and unburned calcic carbonate and dolomitic materials with a finely divided mineral magnesium silicate, and calcining the mixture at a temperature of approximately 1000° C., the proportions of the mixture being such as to induce liberation of the MgO content of the silicate.

4. The process which comprises the steps of mixing a finely divided material of the group consisting of burned and unburned calcic carbonate and dolomitic materials with a finely divided mineral magnesium silicate, and calcining the mixture at a temperature of approximately 1100° C., the proportions of the mixture being such as to induce liberation of the MgO content of the silicate.

5. The process which comprises the steps of mixing a finely divided dolomite with a finely divided mineral magnesium silicate, and calcining the mixture at a temperature of approximately 850° C. in an atmosphere of steam, the proportions of the mixture being such as to induce liberation of the MgO content of the silicate.

6. The process which comprises the steps of mixing a finely divided dolomite with a finely divided mineral magnesium silicate, and calcining the mixture at a temperature of approximately 1000° C., the proportions of the mixture being such as to induce liberation of the MgO content of the silicate.

7. The process which comprises the steps of mixing a finely divided dolomite with a finely divided mineral magnesium silicate, and calcining the mixture at a temperature of approximately 1100° C., the proportions of the mixture being such as to induce liberation of the MgO content of the silicate.

WALTER H. MacINTIRE.